(12) United States Patent
Althouse, III

(10) Patent No.: US 7,237,778 B1
(45) Date of Patent: Jul. 3, 2007

(54) SHUT OFF VALVE ASSEMBLY ABOUT A SHAFT OF A DEVICE HAVING AN ENTRY INTO A VESSEL

(75) Inventor: James W. Althouse, III, Hudson, OH (US)

(73) Assignee: ProQuip, Inc., Macedonia, OH (US)

( * ) Notice: Subject to any disclaimer, the term of this patent is extended or adjusted under 35 U.S.C. 154(b) by 377 days.

(21) Appl. No.: 11/012,525

(22) Filed: Dec. 15, 2004

Related U.S. Application Data

(60) Provisional application No. 60/529,552, filed on Dec. 15, 2003.

(51) Int. Cl.
*B01F 15/00* (2006.01)
(52) U.S. Cl. .................. 277/630; 277/370; 277/637; 277/914; 366/331; 366/608
(58) Field of Classification Search ............... 366/279, 366/331, 343, 608; 277/370, 630, 637, 641, 277/642, 914
See application file for complete search history.

(56) References Cited

U.S. PATENT DOCUMENTS

| | | | |
|---|---|---|---|
| 3,679,217 A | * | 7/1972 | Lesiecki ................. 277/425 |
| 4,106,778 A | * | 8/1978 | Cormack et al. .......... 277/370 |
| 4,511,255 A | * | 4/1985 | Saucier .................. 366/138 |
| 4,878,677 A | | 11/1989 | Larkins et al. |
| 5,078,506 A | * | 1/1992 | Tischer .................. 366/314 |
| 5,303,933 A | | 4/1994 | Larkins |
| 5,690,341 A | * | 11/1997 | Prough et al. ........... 277/511 |
| 6,193,409 B1 | * | 2/2001 | Brunson et al. .......... 366/331 |
| 6,616,326 B2 | * | 9/2003 | White ................... 366/331 |
| 6,742,923 B2 | | 6/2004 | Blakley et al. |
| 6,746,147 B2 | | 6/2004 | Blakley et al. |

FOREIGN PATENT DOCUMENTS

AU 41984/85 A * 11/1986

* cited by examiner

*Primary Examiner*—David Sorkin
(74) *Attorney, Agent, or Firm*—D. Peter Hochberg; Sean Mellino

(57) ABSTRACT

The invention is a shut-off seal assembly for use with the drive assembly of fluid-containing vessels. The shut-off seal assembly first locks the seal carrier of the drive assembly in place so that it may not rotate in a clockwise or a counter-clockwise direction. The seal carrier includes a pair of notches into which a pawl may be fitted preventing seal carrier rotation. The seal carrier surrounds a sleeve which includes a plurality of slots. A backwards rotation of the drive shaft causes drive pins to slide in the angled slots, thereby causing the seal element to move forward and create a seal between the drive assembly and the vessel.

27 Claims, 5 Drawing Sheets

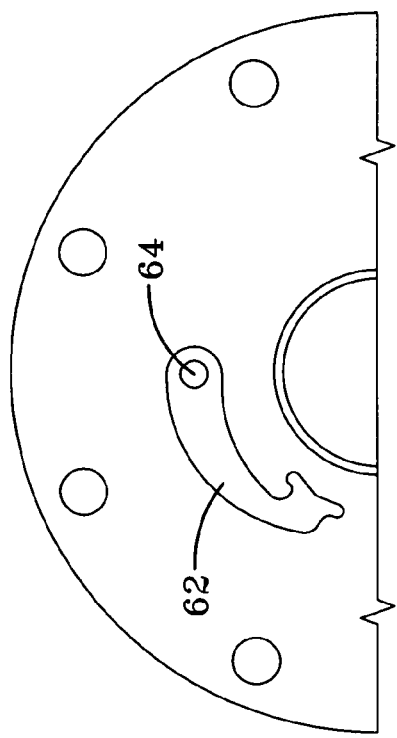
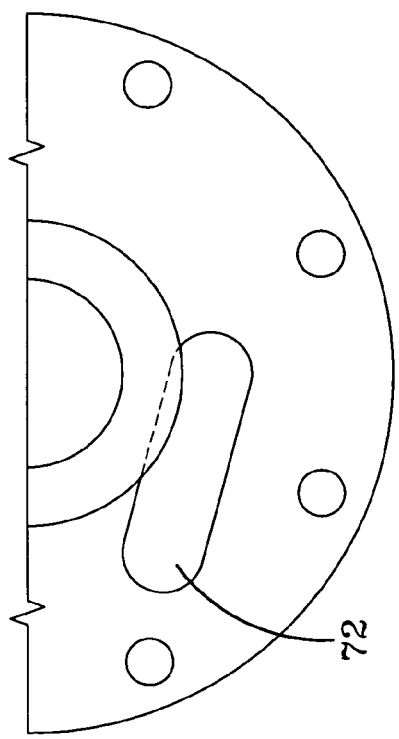
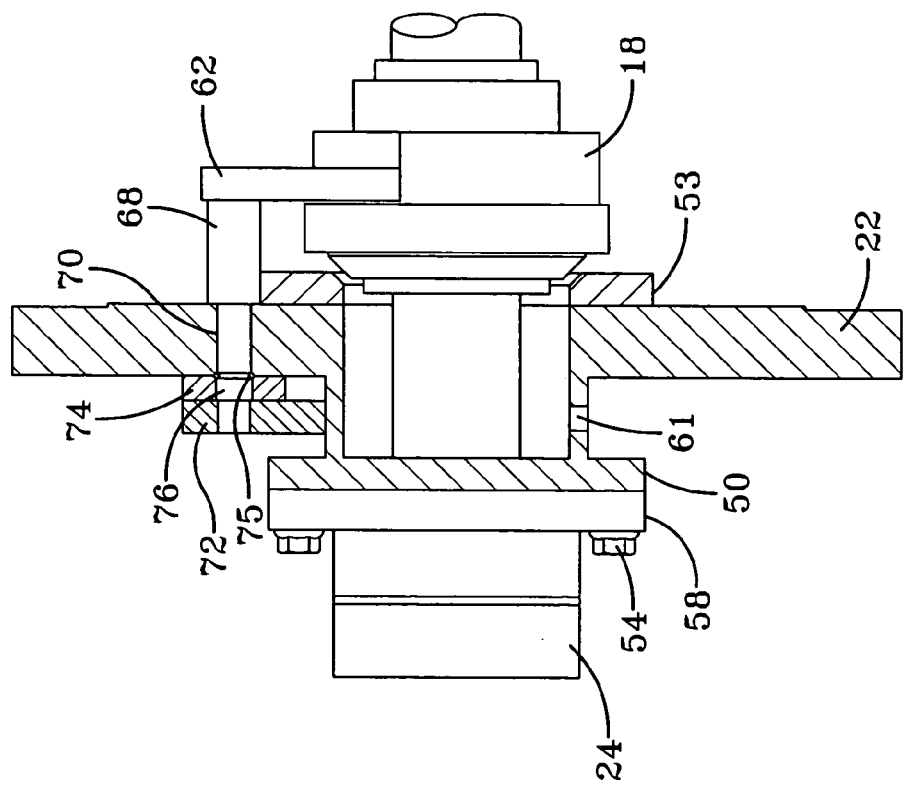

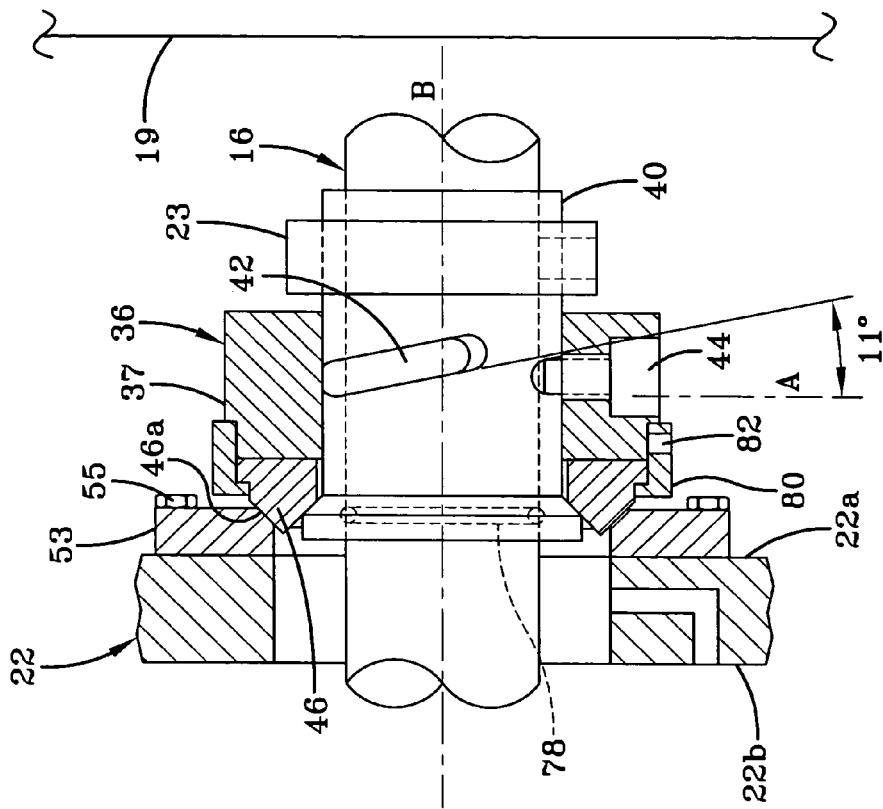
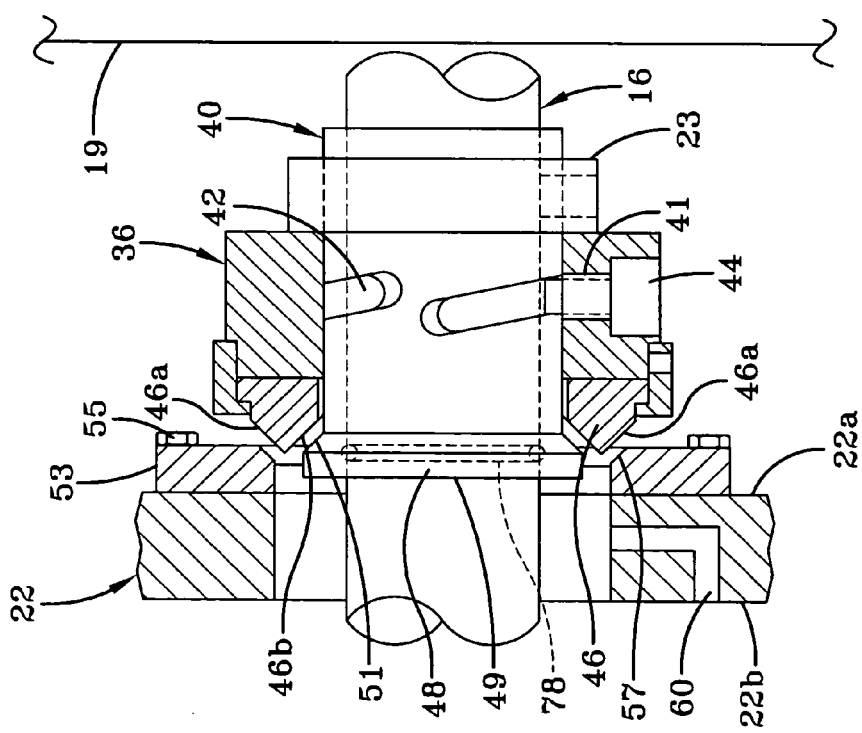
FIG-7
FIG-8

SHUT OFF VALVE ASSEMBLY ABOUT A SHAFT OF A DEVICE HAVING AN ENTRY INTO A VESSEL

CROSS REFERENCE TO RELATED APPLICATIONS

This application claims the benefit of U.S. provisional patent application No. 60/529,552 filed on Dec. 15, 2003, which is incorporated by reference in its entirety herein.

BACKGROUND OF THE INVENTION

1. Field of the Invention

The invention relates to a valve secured to a rotatable shaft that enters a liquid-containing vessel, such as a mixing vessel. More specifically, the present invention relates to a valve that temporarily seals the vessel to facilitate servicing or replacement of the mechanical seal, which is the primary seal between the vessel and the shaft.

2. Description of the Prior Art

The invention relates to a shut-off valve/sealing device for a rotatable shaft that enters a vessel which contains a fluid therein, such as a liquid or a gas, or any other type of flowable material, the fluid being mixed through an opening in the vessel below the level of the fluid. The invention is particularly applicable to large fluid-containing mixing vessels which accommodate an agitator or impeller driven by a motorized shaft. The drive means for driving the rotatable shaft is located outside the vessel with the drive shaft extending through an opening in the vessel, the opening generally being below the level of the fluid contained inside the vessel. The drive means is normally at a relatively low level on the vessel (in other words towards the base of the vessel), thereby necessitating the use of a seal, such as a mechanical seal or stuffing box, around the shaft at the shaft's entry point via the opening into the vessel in order to prevent fluid leakage or escape. Such rotating shafts are often times equipped with a sealant packing contained within a stuffing box housing about the shaft at the shaft's point of entry into the vessel. When the packing is no longer functioning properly, it must be replaced. The shaft may also be equipped with a rotary seal which is subject to normal wear and tear from use near the point of entry of the shaft into the vessel. The rotary seal includes various components which inevitably need replacement or repair.

Typically, when the worn packing or components of the rotary seal or stuffing box need replacement, the entire contents of the mixing vessel must be drained or otherwise removed since the removal of the packing breaks the seal about the shaft at its point of entry into the vessel. The emptying of the vessel is a time-consuming and expensive process and also can potentially cause unnecessary and undesirable waste of some or all of the contents of the vessel, contamination of the vessel contents, or exposure to potentially harmful liquids or noxious gases to persons servicing the seal or tending to the vessel.

U.S. Pat. Nos. 4,878,677 and 5,303,933 (Larkins et al.) and (Larkins), describe similar devices for providing a shut-off seal for a rotatable shaft without disturbing the housing or rotary seal, as the case may be. Jacking screws are employed, which reach through the flange, for engagement with a shut-off ring. Such devices require the draw of multiple screw jacks to be even or balanced. This is disadvantageous in that a complete and balanced seal is not ensured, thereby allowing the potential for some fluid leakage.

Another significant disadvantage with the aforementioned devices is that both devices employ O-ring seals which serve to prevent leakage around the respective device, even when the device is not in use. When put into use, the O-ring seals are dragged across surfaces that have been exposed to the vessel contents, thereby risking damage to the seals. Furthermore, such damage to the seals risks causing subsequent leakage when the device is returned to its storage position.

There is a need for an improved shut-off seal device for use with a rotatable shaft which extends into a mixing tank or vessel.

SUMMARY OF THE INVENTION

It is an object of the present invention to provide an improved sealing valve for a drive shaft assembly having a primary seal, where there is no requirement to disturb the primary seal at the shaft's entry point into the vessel for readying the primary seal for service.

Another object of the present invention is to provide an improved sealing valve for a drive shaft assembly where the seal carrier component of the sealing valve creates an even and secure seal between the drive assembly and the fluid-containing vessel.

It is an additional object of the present invention to provide an improved sealing valve for a drive shaft assembly where the sealing valve holds the drive shaft on center so that the drive shaft is immobile during servicing of the drive assembly.

Yet a further object of the present invention is to provide an improved sealing valve for a drive shaft assembly where engagement of the sealing valve is by a short manual rotation of certain components of the valve and drive assemblies.

Another object of the present invention is to provide an improved sealing valve for a drive shaft assembly which is comprised of a minimal number of components.

Another object of the present invention is to provide an improved sealing assembly for a drive shaft assembly that easy to use and is easily installed.

The invention extends to features hereinafter fully described. The following description and the annexed drawings set forth in detail certain illustrative examples of the invention. These examples are indicative, however, of but a few of the various ways in which the principles of the invention may be employed. Other objects, advantages, and novel features of the invention will become apparent from the following detailed description of the invention when considered in conjunction with the drawings.

BRIEF DESCRIPTION OF THE DRAWINGS

FIG. 2 is a cross-sectional side view of the shut-off sealing valve of the present invention.

FIG. 3 is an internal side view of one component of the shut-off sealing valve of the present invention.

FIG. 4 is an external side view of one component of the shut-off sealing valve of the present invention shown in FIG. 2.

FIG. 7 is a cross-sectional side view of the shut-off sealing valve of the present invention in a disengaged position.

FIG. 8 is a cross-section side view of the shut-off sealing valve of the present invention in an engaged position.

DESCRIPTION OF THE PREFERRED EMBODIMENTS

Figure 1:
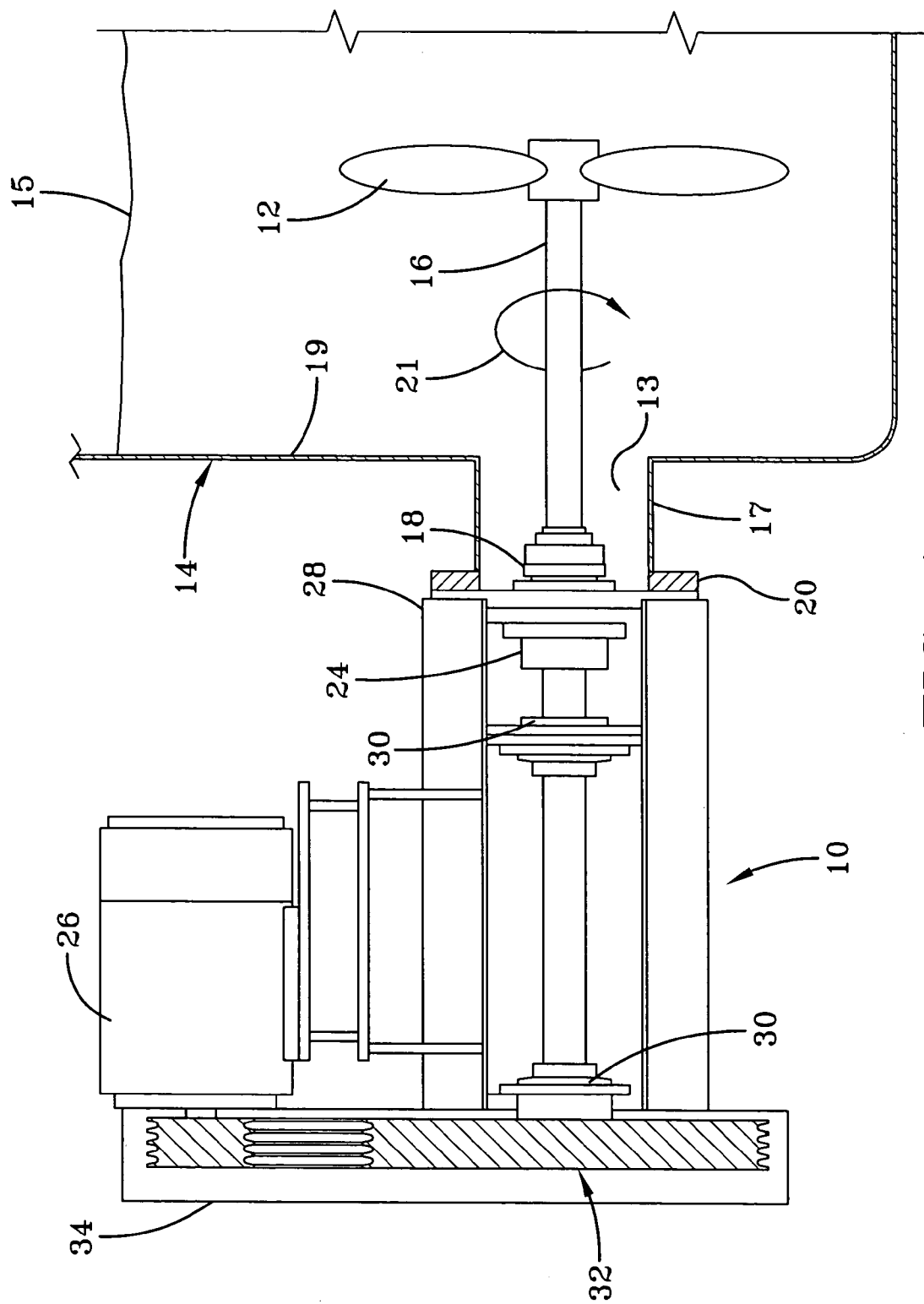
FIG. 1 is a side view of the drive assembly with which the shut-off sealing valve of the present invention is used.

Referring first to FIG. 1, a standard drive assembly 10 with which the present invention is employed is shown and described. Drive assembly 10 includes an impeller 12 for mixing a material inside a holding/mixing tank or vessel 14. For purposes of this description, the material is a liquid fluid, however it can be any other type of flowable material such as a gaseous fluid, or even a granular material or liquid-granular composition Drive assembly 10, notably impeller 12, is preferably located below the fluid level 15 of the fluid inside vessel 14. Impeller 12 is secured to a drive shaft 16, which extends through an opening 13 in vessel wall 14 via a flange 20 mounted on a nozzle 17 on the wall 19 of vessel 14. Flange 20 may also be mounted directly onto wall 19 of vessel 14 with nozzle 17 omitted. Drive shaft 16 is rotatably secured to and extends through shut-off sealing valve 18, a mechanical seal 24 and ultimately is rotatably engaged to a series of belts and sheaves 32 which are enclosed in a belt guard or housing 34 and driven by a standard motor 26. The rotation of drive shaft 16 is facilitated by a series of roller-type bearings 30, which are enclosed in a drive assembly base or housing 28. Both drive assembly housing 28 and belt housing 34 can be any housing known in the art, preferably a metal or thermoplastic compartment having a rectangular, circular or any other conventional shape large enough to enclose the various respective components contained therein. Although being shown in the context of a side entry variation, it should be appreciated that the shut-off seal assembly can be used with a bottom-entry drive assembly to prevent the escape of fluid or a top-entry drive assembly in order to prevent the escape of fumes, especially noxious fumes. It should also be appreciated that the present invention may be used with any equipment having rotating sealed shafts passing into a vessel and is not limited to just mixers or agitators used with a mixing vessel.

Figure 5:
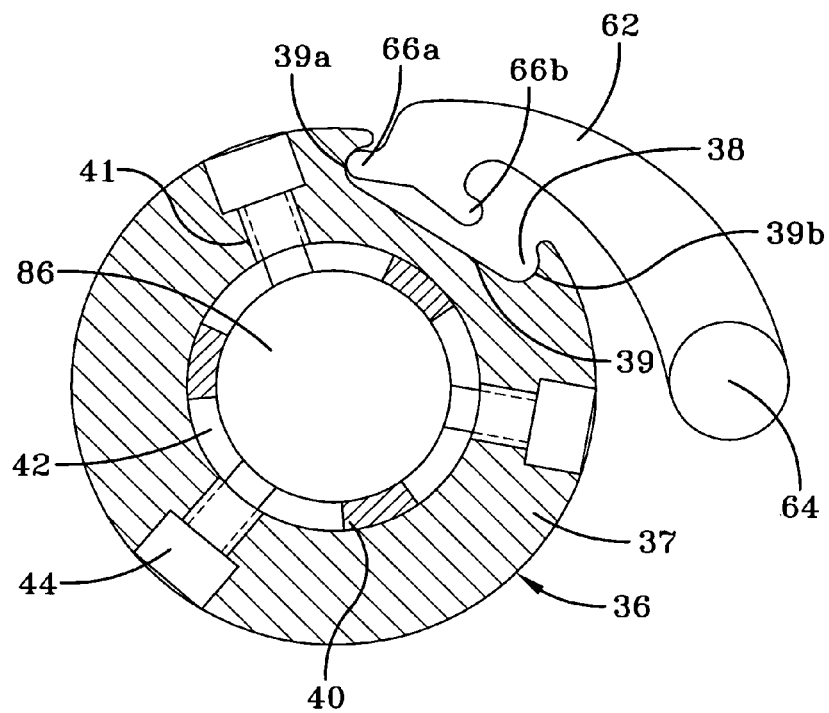
FIG. 5 is a cross-sectional view of one component of the shut-off sealing valve of the present invention shown in FIG. 2.

Turning next to FIGS. 2–8, one embodiment of shut-off sealing valve 18 and its various components will be described in greater detail. Shut-off sealing valve 18 includes a seal carrier 36 (FIG. 5) having at least one notch 38 (FIG. 5) thereon. Each notch 38 includes an engageable portion 39. In this case, engageable portion 39 includes two opposing lips 39a, b. As shown in FIG. 5, just one notch 38 is preferably employed on seal carrier 36. Seal carrier 36 includes a cylindrical body 37 (FIG. 8) and a seal element 46 (FIG. 8) for sealing vessel 14. Seal element 46 can be a standard seal in the art, such as a seal having two outwardly beveled faces 46a, b extending in the direction away from vessel 14. Body 37 of seal carrier 36 extends around an optional cylindrical sleeve 40 (FIGS. 5 & 8). Sleeve 40 defines an orifice 86 (FIG. 5) which has a circumference for securely accommodating drive shaft 16 therethrough. Sleeve 40 allows valve 18 to be properly set more easily by allowing for axial adjustment along shaft 16 during assembly. Sleeve 40 includes a plurality of slots 42, slots 42 being angled with respect to a perpendicular axis (A) extending through a longitudinal axis (B) to shaft 16, as shown in FIGS. 7 and 8 and the slots 42 being optionally threaded. Slots 42 form part of a spiral on sleeve 40 Angled slots 42 are strategically situated on sleeve 40 in a manner which protects them from contaminants in the vessel 14 which could clog angled slots 42, or make them otherwise inoperable. In other words, seal carrier 36 also acts as a barrier for slots 42. Slots 42 are preferably equidistantly spaced from each other.

Sleeve 40 further includes a seal seat 48 at the distal end of sleeve 40 from vessel 14 having a flat side 49 and a beveled or recessed side 51 (FIG. 7). Beveled side 51 of seal seat 48 faces in the direction towards the inside of the vessel 14. When sleeve 40 is not employed, slots 42 and seal seat 48 are configured directly into shaft 16. A plurality of connectors 44, such as a plurality of drive pins, extends and threads through seal carrier 36 via a plurality of threaded seal carrier holes 41 to hold connectors 44 in place and allowing each connector 44 to be engageable with a corresponding slot of plurality of slots 42 in sleeve 40 when valve 18 is in operation. To this end, it is preferred that an equal number of slots 42 and connectors 44 are employed. Slots 42 can be angled from 2° relative to the perpendicular axis A to 45°. As shown in FIG. 8, slots 42 are angled at 11° relative to perpendicular axis A. Slots 42 are angled and arranged to form a spiral-like or screw thread-like path that connectors 44 follow as sleeve 16 is rotated. Sleeve 40 is fitted with an O-ring 78. A seal element retainer 80 (FIG. 8) secures seal element 46 to seal carrier 36 by way of a pair of set screws 82 (FIG. 8). Connectors 44 can be, for example, socket head cap screws having an adjusted threaded end to form a pin end.

As shown in FIGS. 2–8, shut-off sealing valve 18 may generally be used with a mounting flange 22. Mounting flange 22 includes an inside face 22a and an outside face 22b. A sealing ring 53 (FIGS. 7 and 8) is installed on the inside of mounting flange 22 (i.e., on the side facing vessel wall 19) by bolts 55 and is sealed to the inside flange face 22a with sealing compound or a gasket (not shown). The sealing ring 53 has an inwardly beveled or recessed face 57 which corresponds to and is able to engage seal element 46 when the seal carrier 36 is in the shut-off position (FIG. 8). The outside face 22b of mounting flange 22 is provided with an adapter flange 50 (FIG. 2) which is secured to a flanged end 58 of mechanical seal 24.

Figure 9:
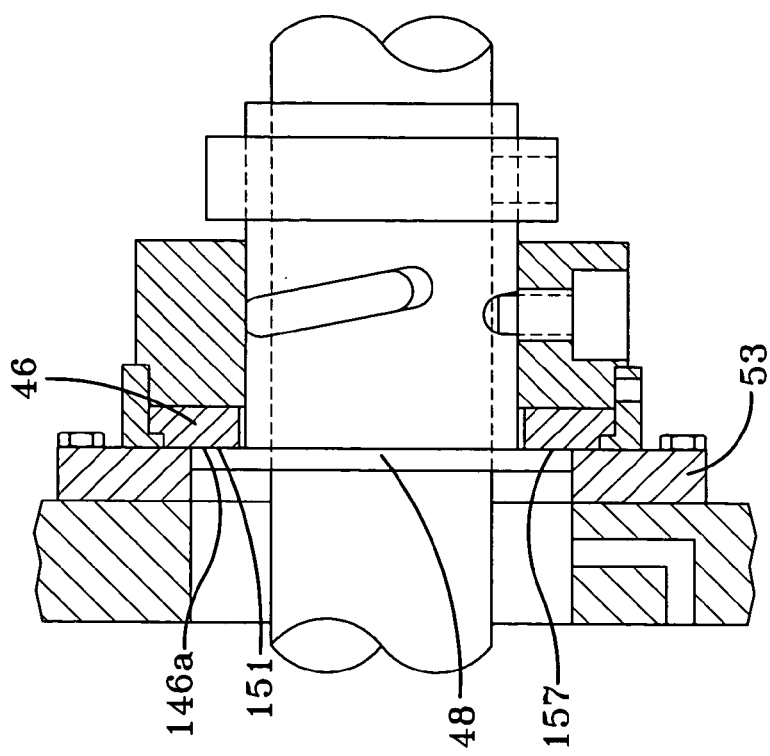
FIG. 9 is a cross-section side view of an alternative embodiment of the shut-off sealing valve of the present invention in an engaged position.

An alternative embodiment of the present invention is shown in FIG. 9. In this embodiment, each of the aforementioned features of assembly 18 are the same as described above except seal 46 has a substantially flat face 146a, sealing ring 53 has a substantially flat face 157 and seal seat 48 has a substantially flat face 151. Therefore, the sealing arrangement in this embodiment includes seal 46 contacting seal ring 53 and seal seat 48 by way of a flat interface.

Figure 10:
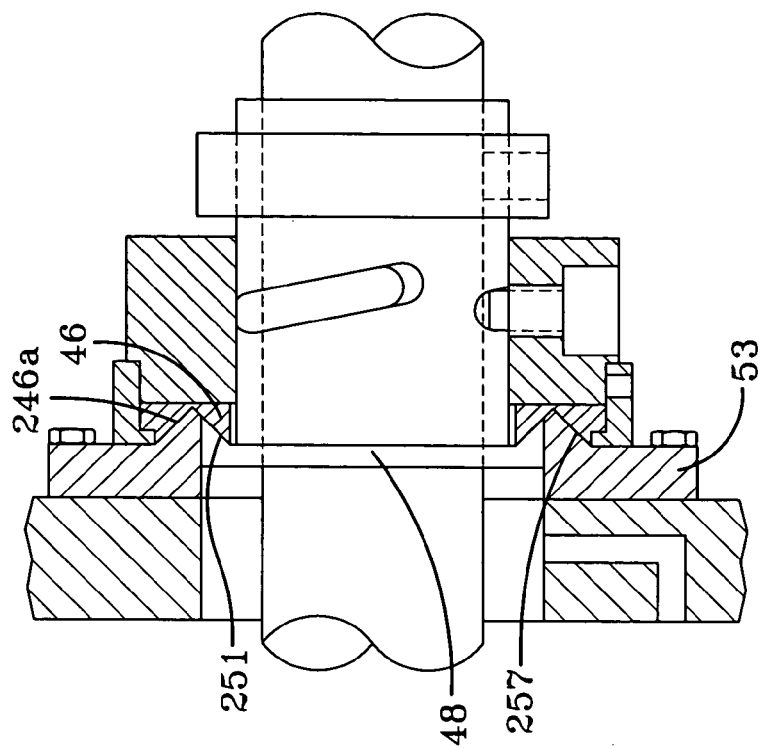
FIG. 10 is a cross-section side view of another alternative embodiment of the shut-off sealing valve of the present invention in an engaged position.

Another alternative embodiment of the present invention is shown in FIG. 10. In this embodiment, each of the aforementioned features of assembly 18 are still the same as described in the first embodiment except seal 46 has an inwardly beveled or recessed face 246a, sealing ring 53 has an outwardly beveled face 257 and seal seat 48 has an outwardly beveled face 251. Therefore, the sealing arrangement in this embodiment is substantially the reverse as that described above in the first embodiment.

Mounting flange 22 may also include a flush/test port 60 (FIG. 7). Flush port 60 is advantageous in that it allows for a continuous flush of clean fluid to keep the seal region clean. Flush port 60 also can be used as a testing device to determine whether shut-off sealing valve 18 is correctly seated before the servicing of primary seal 24 commences. Flush port 60 is also advantageous in that by applying pressure to flush port 60 after servicing of mechanical seal (or packing) 24, the user can ascertain whether mechanical seal (or packing) 24 has been correctly reinstalled (i.e., will "hold pressure") before valve 18 is unseated and mechanical seal (or packing) 24 is again used as the primary seal. It should be appreciated that flush port 60 is just one version that may be employed and other versions known in the art, such as flush test port 61 (FIG. 2) which may also be employed.

Figure 6:
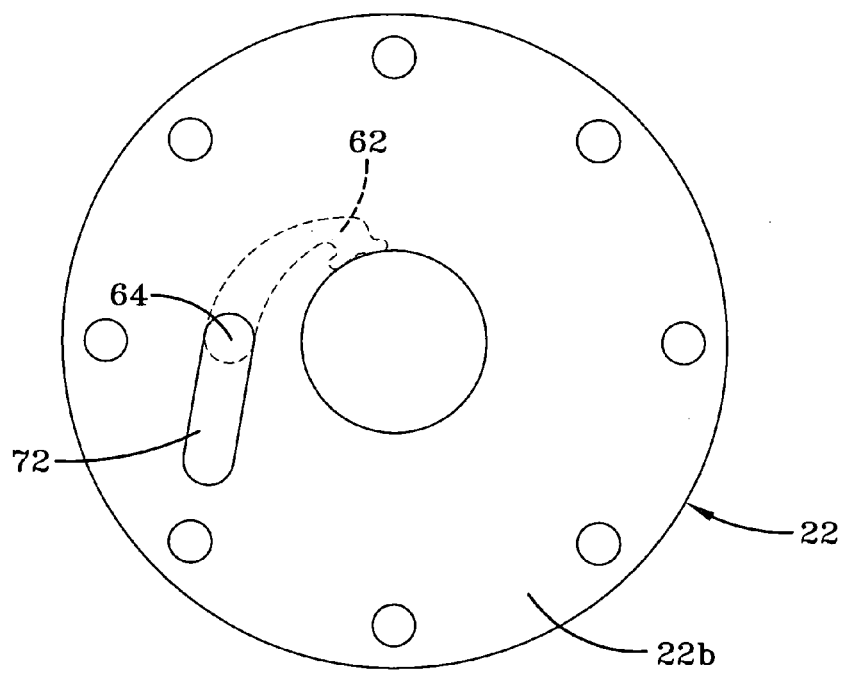
FIG. 6 is a front view of one component of the shut-off sealing valve of the present invention shown in FIG. 2.

Referring to FIGS. 2, 5 and 6, shut-off sealing valve 18 further includes a moveable shaft-rotation-restriction device. In this embodiment, the shaft-rotation-restriction device includes a pawl 62 extending partially around seal carrier 36. As explained below, pawl 62 is mounted for pivotable movement towards and away from seal carrier 36, and need not necessarily extend partially around seal carrier 36. Pawl 62 includes a pivot point 64 and two opposing prongs or fingers 66a, b. Pivot point 64 is preferably centrally located on pawl 62; however, it can be off-centered without disrupting the functionality of pawl 62. The distance between opposing fingers or prongs 66a, b is smaller than the width of notch 38 in seal carrier 36. A pawl shaft 68 (FIG. 2) is secured to pivot point 64 of pawl 62. Pawl shaft 68 extends through mounting flange body 22 through a mounting flange minor orifice 70 and is operatively connected to an easily accessible handle 72 on the outside of mounting flange 22. A seal plate 74 (FIG. 2) is secured between handle 72 and mounting flange 22. Seal plate 74 includes an orifice 76 through which pawl shaft 68 also extends. An O-ring, valve stem packing or any other suitable stem sealing device 75 may be incorporated with seal plate 74 to provide a seal between seal plate 74 and mounting flange 22 as pawl shaft 68 extends therethrough.

Employment of shut-off seal assembly 18 includes two significant functions. Referring to FIGS. 3–6, the first function will be discussed. When a user desires to service mechanical seal 24 (or a stuffing box (not shown), as the case may be), handle 72 is manually rotated in a clockwise direction (or a counter-clockwise direction, depending on the particular configuration of the components of device 18). As handle 72 is rotated, pawl 62 rotates accordingly to cause at least one finger of fingers 66a, b (FIG. 5) to engage with the notch 38 on seal carrier 36. As shown in FIG. 5, prong 66a engages notch 38 directly below lip 39a. The engagement of prong 66a in notch 38 on seal carrier 36 locks seal carrier 36 in place and prevents seal carrier 36 from rotating in either a counter-clockwise or a clockwise direction. This allows the user to proceed to the second function of assembly 18.

Referring to FIGS. 7 and 8, the sealing mechanism of shut-off sealing valve 18 will be discussed. FIG. 7 demonstrates shut-off seal assembly 18 in a partially engaged position, although seal carrier 36 has been locked in place as described above. In this position, mechanical seal 24 is the only mechanism providing a seal between drive assembly 10 and vessel wall 19. Once seal carrier 36 is secured and unable to rotate in any direction, the user manually turns shaft drive 16 in a direction opposite from the normal operating direction. The normal operating direction of drive shaft 16 is generally clockwise when viewed towards vessel 14 and shown by arrow 21 in FIG. 1, and therefore in this instance shaft drive 16 would be rotated in a counter-clockwise direction. It should be appreciated that if the normal operational direction of drive shaft 16 is counter-clockwise, then drive shaft 16 would be manually rotated in a clockwise direction. The manual backwards rotation of drive shaft 16 causes sleeve 40 and slots 42 on sleeve 40 to rotate accordingly, thereby causing connectors 44 to slide in slots 42 and to lock seal carrier 36 in place. Since seal carrier 36 is locked, angled slots 42 cause seal carrier 36 to advance against rotation and towards sealing ring 53 and mounting flange 22 (FIG. 8) with a screw-like or spiral-like action. When the sealing element 46 on seal carrier 36 seats, seal carrier 36 is now fully locked in position and unable to rotate in a clockwise or counter-clockwise direction, nor move in an axial direction. The advancement of seal carrier 36 (towards mounting flange 22) causes seal element 46 to engage with beveled face 51 of seal seat 48 and beveled face 57 of sealing ring 53, thereby sealing vessel 14 and preventing any liquid leakage. In other words, the opposing beveled faces of seal seat 48 and sealing ring 53 allow beveled face 46a of seal element 46 to engage seal seat 48 and sealing ring 53 in a substantially cone-like manner (FIG. 8). When shut-off sealing valve 18 is in position as set forth above, O-ring 78 and seal element 46 cooperatively provide a fluid tight seal, thereby relieving mechanical seal 24 (or stuffing box) of its sealing function and allowing for the removal, maintenance, etc. of mechanical seal 24. An annular collar 23 (FIG. 7) can also be employed configured around sleeve 40 to aid in securing sleeve 40 in place around shaft 12. As shown in FIG. 7, collar 23 may be placed between seal carrier 36 and vessel wall 19.

Once servicing of mechanical seal 24 has been completed, the user simply rotates drive shaft 16 in the direction opposite from that rotated to cause engagement of shut-off sealing valve 18. In other words, drive shaft 16 is now rotated in its operational direction, which is generally in a clockwise direction when viewed from the direction of facing assembly 18 and vessel 14, as indicated by directional arrow 21 (FIG. 1). The opposite rotation causes connectors 44 to slide in angled slots 42 back to their original position, thereby forcing seal carrier 36 to move back into its original position towards away from sealing element 53 and mounting flange 22. In turn, seal element 46 disengages from beveled face 48 of sleeve 40. The user then may rotate handle 72 in the opposite direction handle 72 was rotated above, thereby placing pawl 62 in a neutral position and disengaging fingers 66 from notch 38 and allowing seal carrier to rotate accordingly.

It should be appreciated that the components of shut-off sealing valve 18 may be comprised of any material known in the art that would be chemically or physically compatible with the flowable material inside vessel 14. The components could be thermoplastic, or could even be comprised of metal, such as stainless steel. This provides a significant advantage over inflatable donut packings which are often used in this type of operation. It should also be appreciated that the shut-off sealing valve of the present invention is not limited to mixers or agitators, but may also be used with pumps and similar equipment which employ rotating sealed shafts passing into a vessel holding liquid and/or fumes, or can even also be used with other devices which employ shafts entering a vessel, such as pumps or various marine applications.

The invention has been described in detail, with particular emphasis being placed on the preferred embodiments thereof, but variations and modifications may occur to those skilled in the art to which the invention pertains.

I claim:

1. A shut-off seal assembly for use with a vessel for holding a flowable material, the vessel employing a rotatable shaft with a longitudinal axis extending through an orifice in a wall of said vessel and having a vessel mechanical seal for assisting in preventing the escape of the flowable material along the shaft, said shut-off seal assembly comprising:
    a seal carrier comprising:
        a substantially cylindrical seal carrier body having a first side facing the vessel and a second side facing away from the vessel;
        at least one notch in said seal carrier body, said at least one notch having at least one engageable portion;
        at least one seal carrier hole extending through said seal carrier body;
        at least one connector corresponding to said at least one seal carrier hole and extending through a respective hole of said at least one seal carrier hole of said seal carrier body; and
        a seal on said second side of said seal carrier body;
    a sleeve disposed within said seal carrier, said sleeve comprising:
        a substantially cylindrical sleeve body having a cross-sectional interior diameter for securely receiving said shaft, said sleeve body having an outer surface;
        a first sleeve body end;
        a second sleeve body end; and
        a plurality of angled slots on said outer surface of said sleeve body, each of said slots corresponding to and able to receive said respective connectors extending through said seal carrier holes;
    a seal seat secured to said sleeve at said second sleeve body end of said sleeve for engaging with said seal when said assembly is in operation;
    a moveable rotation restriction device for restricting the rotation of the shaft engageable with said engageable portion of said seal carrier notch in response to the movement of said rotation restriction device; and
    a mounting flange for mounting said assembly to the vessel mechanical seal, said mounting flange having a first side facing said vessel and a second side facing away from the vessel, said mounting flange including a sealing ring on said side facing said vessel for engaging with said seal when said assembly is in operation, wherein said seal, said seal seat and said sealing ring are configured to form a flowable material-tight engagement when said assembly is in use.

2. The assembly according to claim 1 wherein said at least one engageable portion of said notch is at least one lipped edge.

3. The assembly according to claim 2 wherein said at least one lipped edge is two opposing lips.

4. The assembly according to claim 2 wherein said angled slots are angled from 2° to 45° relative to a plane perpendicular to the longitudinal axis of the shaft.

5. The assembly according to claim 4 wherein said angled slots are angled 11° relative to a plane perpendicular to the longitudinal axis of the shaft.

6. The assembly according to claim 1 wherein said rotation restriction device is a pivotable pawl pivotable towards and away from said seal carrier, said pawl comprising:
    a first pawl end having at least one prong corresponding to said at least one notch;
    a second pawl end having a pivot point; and
    a pivoting mechanism operably connected to said pivot point by a shaft, wherein said at least one prong engages said notch on said seal carrier by abutting said notch at said engageable portion in response to the pivoting of said pivoting mechanism.

7. The assembly according to claim 6 wherein said at least one prong is two opposing prongs.

8. The assembly according to claim 6 wherein said mounting flange includes an orifice, said pawl shaft extending through said orifice.

9. The assembly according to claim 1 wherein said angled slots are angled in a spiral-like formation for part of a spiral on said seal.

10. The assembly according to claim 1 wherein said seal seat has a recessed face facing in the direction towards said seal, said seal has an outwardly beveled end comprising an outwardly beveled face facing said sealing ring and said seal seat, and said sealing ring has a recessed face facing said seal, said beveled end and said recessed ends being engageable to form said flowable material-tight engagement when said assembly is in operation for preventing the flow of flowable material out of the vessel.

11. The assembly according to claim 10 wherein said seal beveled faces are beveled at an angle greater than 0° and up to 45° relative to the longitudinal axis of the shaft and said seal seat recessed face and said sealing ring recessed face are recessed at a complimentary angle to said seal beveled faces.

12. The assembly according to claim 1 wherein said seal seat has an outwardly beveled end facing in the direction towards said seal, said seal has a recessed face comprising two opposing recessed faces facing said sealing ring and said seal seat, and said sealing ring has an outwardly beveled face facing said seal, said beveled faces and said recessed face being engageable to form said flowable material-tight engagement when said assembly is in operation for preventing the flow of flowable material out of the vessel.

13. The assembly according to claim 12 wherein said seal recessed faces are recessed at an angle greater than 0° and up to 45° relative to the longitudinal axis of said shaft and said seal seat beveled face and said sealing ring beveled face are recessed at a complimentary angle to said seal recessed faces.

14. The assembly according to claim 1 wherein said seal seat has a substantially flat end facing in the direction towards said seal, said seal has a substantially flat end facing said sealing ring and said seal seat, and said sealing ring has a substantially flat end facing said seal, said substantially flat ends being engageable to form said flowable material-tight engagement when said assembly is in operation for preventing the flow of flowable material out of the vessel.

15. The assembly according to claim 1 wherein said assembly further comprises a device for securing said sleeve to said seal seat.

16. The assembly according to claim 15 wherein said device is an O-ring.

17. The assembly according to claim 1 wherein said assembly further comprises a screw and nut assembly for securing said seal element to said seal carrier.

18. The assembly according to claim 1 wherein said mounting flange further includes a flush/test port.

19. The assembly according to claim 18 wherein said flush/test port is either a side port or an underneath port.

20. The assembly according to claim 1 and further comprising a seal plate between said pivoting mechanism and said mounting flange.

21. The assembly according to claim 20 wherein said seal plate further comprises an orifice, said shaft extending through said orifice.

22. The assembly according to claim 1 wherein said pivoting mechanism is a handle.

23. The assembly according to claim 22 wherein the distance between said two opposing lips is greater than the distance between said two opposing prongs.

24. The assembly according to claim 1 wherein said plurality of connectors is a plurality of drive pins.

25. The assembly according to claim 1 wherein said assembly further includes an annular collar disposed on said shaft between said seal carrier and said vessel.

26. A shut-off seal assembly for use with a vessel for holding a flowable material, said vessel having a wall and an orifice in said wall and having a vessel mechanical seal for assisting in preventing the escape of the flowable material from said vessel, said assembly comprising:
   a rotatable shaft extending through said orifice, said shaft having a first end operably connected to a mixing apparatus for mixing the flowable material, a second end operably connected to a rotational drive apparatus for rotating said shaft, a longitudinal axis and an outer surface;
   a seal carrier comprising:
      a substantially cylindrical body having a first side facing the vessel and a second side facing away from the vessel;
      at least one notch in said body, said at least one notch having at least one engageable portion;
      a plurality of seal carrier holes extending through said body;
      a plurality of connectors corresponding to said plurality of seal carrier holes extending through said respective slots in said body; and
      a seal on said second side of said body;
      a plurality of angled slots on said outer surface of said shaft, each of said slots corresponding to and able to receive said respective connectors extending through said seal carrier holes;
   a seal seat secured to said shaft at the base of said seal carrier for engaging with said seal when said assembly is in operation;
   a moveable rotation restriction device for restricting the rotation of said shaft engageable with said engageable portion of said seal carrier notch in response to the movement of said rotation restriction device; and
   a mounting flange for mounting said assembly to the vessel mechanical seal, said mounting flange having a first side facing said vessel and a second side facing away from said vessel, said mounting flange including a sealing ring on said side facing said vessel for engaging with said seal when said assembly is in operation, wherein said seal, said seal seat and said sealing ring are configured to form a flowable material-tight engagement when said assembly is in use.

27. A shut-off seal assembly for use with a vessel for holding a flowable material employing a rotatable shaft extending through an orifice in a wall of said vessel and having a vessel mechanical seal for assisting in preventing the escape of the flowable material along the shaft, the shaft having a longitudinal axis, said assembly comprising:
   a seal carrier comprising:
      a substantially cylindrical body having a first side facing the vessel and a second side facing away from the vessel;
      a notch in said body, said notch having two opposing lipped edges;
      a plurality of seal carrier holes extending through said body;
      a plurality of drive pins corresponding to said plurality of seal carrier holes extending through said respective slots in said body; and
      a seal on said second side of said body, said seal comprising:
         an annular beveled end extending outwardly from said seal carrier in the direction away from said vessel, said beveled end comprising two opposing beveled faces whereby one of said faces is angled towards the longitudinal axis of the shaft and the other of said faces is angled away from the longitudinal axis of the shaft, and wherein said faces meet at a 90° angle;
   an annular sleeve having a cross-sectional diameter around which said seal carrier extends comprising:
      a substantially cylindrical body having a cross-sectional interior diameter for securely receiving said shaft, said body having an outer surface;
      a first body end;
      a second body end; and
      a plurality of angled slots on said outer surface of said body, each of said slots corresponding to and able to receive said respective drive pins;
   a seal seat secured to said sleeve for engaging with said seal when said assembly is in operation, said seal seat comprising:
      a first end secured to said sleeve at said second end of said sleeve, the first end of said seal seat having an equal diameter to that of said sleeve;
      a second end having a flat annular surface facing away from the vessel;
      an annular wall extending from said seal seat second end towards said first end; and
      an angled face extending from said annular wall to said first end, said angled face angled away from the longitudinal axis of the shaft and configured to form a fluid-tight engagement with said face of said seal angled towards the longitudinal axis of said shaft;
   a pivotable pawl pivotable towards and away from said seal carrier, said pawl comprising:
      a first pawl end having a head, said head having at two opposing prongs;
      a second pawl end having a pivot point;
      a body extending from said first end to said second end; and
      a handle operably connected to said pivot point by a shaft,
      wherein one prong of said two prongs engages said notch on said seal carrier by abutting said notch underneath one lip of said two opposing lips in response to the pivoting of said pawl by operation of said handle;
   a mounting flange for mounting said assembly to the vessel mechanical seal, said mounting flange having a first side facing said vessel and a second side facing away from said vessel, said mounting flange including an annular sealing ring on said side facing said vessel for engaging with said seal when said assembly is in operation, said sealing ring comprising an annular recessed wall at said side facing said vessel, said wall angled towards the longitudinal axis of the shaft and configured to form a fluid-tight engagement with said face of said seal angled away from the longitudinal axis of the shaft, wherein said seal, said seal seat and said sealing ring are configured to form a flowable material-tight engagement when said assembly is in use; and
   a collar having an annular body, said collar secured to said sleeve between said seal carrier and said vessel.

* * * * *